United States Patent Office 3,274,126
Patented Sept. 20, 1966

3,274,126
POLYEPOXY ETHERS AND CURED RESINS
OBTAINED THEREFROM
Roy T. Holm, Orinda, Calif., assignor to Shell Oil Company, New York, N.Y., a corporation of Delaware
No Drawing. Filed Mar. 30, 1962, Ser. No. 183,746
14 Claims. (Cl. 260—2)

This invention relates to novel compositions of matter and their production. More particularly, the present invention relates to polyepoxy compositions and polyepoxy compounds which contain at least one carbocyclic ring and at least two vicinal epoxy groups in the molecule.

It is an object of the present invention to provide a class of new compounds and a method for their preparation. A further object of the invention is to provide a class of novel compositions derived from these new compounds.

The novel compounds of the present invention may be represented by the formula:

(I)        G—O—A—O—G wherein "G" is hydrogen or a carbocyclic radical with from 4 to 8 ring carbon atoms, a total of from 4–25 carbon atoms, and containing an oxygen atom which bridges two vicinal ring carbon atoms; A is a divalent organic group containing at least one oxirane group. At least one "G" group is not hydrogen. A is attached to the two oxygen atoms through carbon atoms and contains a total of from 4 to 20 carbon atoms.

When "G" is a carbocyclic radical, "G" may be derived from cyclic unsaturated radicals, preferably hydrocarbon (such as cyclobutene, cyclopentene, cyclohexene, cyclohexadiene, cycloheptene, cycloheptatriene, cyclooctadiene, and cycloctene) which give epoxy radicals upon epoxidation of the olefinic bonds. Suitable epoxycycloalkyl "G" groups include 2,3-epoxycyclobutyl, 2,3-epoxycyclopentyl, 2,3-epoxycyclooctyl, and 2,3-epoxycyclohexyl radicals. These epoxy-cycloalkyl groups may contain, in addition to the oxirane group, other substituents on the ring nucleus. Suitable ring substituents include alkyl, aryl, alkaryl, aralkyl, alkoxy, aryloxy, and acyl groups of from 1 to 12 carbon atoms. Thus, a particularly suitable subclass of radicals represented by "G" includes monovalent organic groups with the following configurations:

(II)
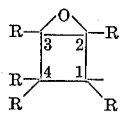

(III)
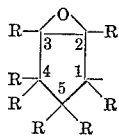

and (IV)
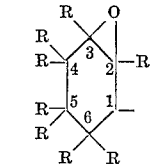

wherein R is selected from the group consisting of hydrogen and alkyl, alkenyl, alkoxy, aryl, aryloxy and acyl radicals wherein each of the aforementioned organic groups contains from 1 to 8 carbon atoms (preferably from 1 to 6 carbon atoms). Suitable "G" radicals include 2-methyl-2,3-epoxycyclobutyl,
2-ethyl-2,3-epoxy-4-phenylcyclobutyl,
2,3-epoxy-3,4-dimethoxycyclobutyl,
1-propyl-2,3-epoxy-4,5-dibenzyl-cyclopentyl,
2,3-epoxy-4-allylcyclopentyl,
1-butyl-2,3-epoxy-3-methylcyclopentyl,
2,3-epoxy-4-vinylcyclopentyl,
1-methyl-2,3-epoxy-4-phenoxycyclopentyl,
2,3-epoxy-5-acetylcyclopentyl,
2,3-epoxycyclopentyl,
2,3-epoxy-4,5,6-trimethylcyclohexyl,
1-phenyl-2,3-epoxy-4,5-dibutylcyclohexyl,
2,3-epoxy-6-butenylcyclohexyl,
1,2-diethoxy-2,3-epoxycyclohexyl, and
2,3-epoxycyclohexyl radicals. In addition to the class of radicals represented by the structures II, III and IV, carbocyclic radicals characterized by rings with from 4–8 ring carbon atoms which contain more than one epoxy group and/or unsaturated olefinic bonds in the ring are also suitable. For example, "G" may be a radical such as 2,3,4,5-diepoxycyclopentyl, 2,3-epoxy-4-cyclobutenyl, and 2,3,5,6-diepoxy-4-cyclohexenyl.

The divalent radical "A" in Formula I may contain a total of from 4 to 25 carbon atoms and at least one vicinal epoxy group (an oxirane group). The divalent radical represented by the symbol "A" is further characterized by the presence of an unbroken chain of carbon atoms linking the two terminal oxygen atoms in the formula

G—O—A—O—G

The length of the carbon chain connecting the two terminal oxygen atoms may be from 2 to 12 carbon atoms with a total of from 2 to 25 (preferably from 3 to 20) carbon atoms in the radical. The divalent radical "A" may be a cyclic group such as a 2,3-epoxy-1,4-cyclohexylene group or a 2,3-epoxy-1,4-cyclopentylene group. When "A" is a linear divalent radical, "A" may be an epoxyalkylene divalent radical such as a 2,3-epoxyheptylene, a 2,3-epoxybutylene, a 3,4-epoxypentylene, a 2,3,4,5-diepoxyhexylene, a 1-methyl-2,3-epoxybutylene, a 1-phenyl-2,3-epoxy-4-benzylpentylene, a 1-tolyl-2,3-epoxy-4-cumylbutylene, and a 2,3-epoxyoctylene. In these groups, an alkylene group is a divalent carbon chain in which each open valence is on a different carbon atom.

One class of divalent groups represented by A are derived from the corresponding alcohols of the formula:

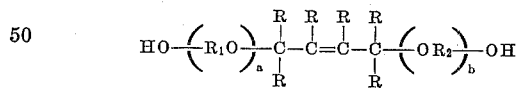

wherein a and b are integers from 0 to 10 such that the sum of a and b is an integer from 0 to 20; R is selected from the group consisting of hydrogen, alkyl radicals of from 1 to 10 carbon atoms (preferably lower alkyl radicals of from 1 to 4 carbon atoms), aryl groups of from 6 to 10 carbon atoms, alkoxy groups of from 1 to 10 carbon atoms, and monovalent organic radicals containing a vicinal epoxy group represented by the formula $(C_nH_{2n-1}O)$ in which n is an integer from 2 to 10 (preferably from 2 to 6); and $R_1$ and $R_2$ are each selected from the group of divalent alkylene radicals consisting of ethylene, propylene and butylene. Alcohols represented by the above formula may be obtained by the reaction of one or more moles of ethylene oxide, propylene oxide, butylene oxide, or mixtures of any of these alkylene oxides with the corresponding diol. For example, from 1 to 20 moles of ethylene oxide or propylene oxide may be reacted with 2-butene-1,4-diol to obtain the corresponding polyalkylene oxide unsaturated diols. When such unsaturated alcohols are employed to prepare the compounds of the present invention, the divalent radical A is represented by the formula:

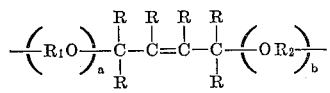

wherein the symbols $a$, $b$, R, $R_1$ and $R_2$ are the same as previously defined for the corresponding alcohols. The R groups on the ethylenic double bond may be linked to form a carbocyclic nucleus of from 4 to 8 ring carbon atoms. For example, 1,2-dimethylol-1-cyclobutene (obtained as disclosed in U.S. Patent 3,018,271, issued January 23, 1962, to J. L. Anderson) may be reacted with ethylene oxide according to the equation:

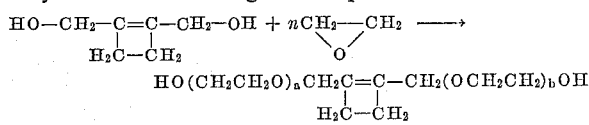

wherein $a$ and $b$ are integers from zero to ten and the sum of $a$ and $b$ equals $n$, an integer from zero to twenty. These diols may then be coupled with unsaturated halogenated carbocyclic compounds followed by epoxidation of the coupled product.

A preferred class of divalent linear radicals "A" is represented by the formula:

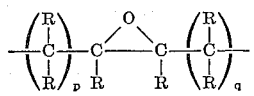

wherein $p$ and $q$ are integers from 1 to 20 such that the sum of $p$ and $q$ equals $n$, and wherein $n$ is an integer from 2 to 20; R may be selected from the group consisting of hydrogen, alkyl radicals of from 1 to 10 carbon atoms (preferably lower alkyl radicals of from 1 to 4 carbon atoms), aryl, alkoxy, aryloxy, and monovalent radicals containing a vicinal epoxy group represented by the formula $(C_nH_{2n-1}O)$ in which $n$ is an integer from 2 to 10 (preferably from 2–6). Suitable aryl groups include phenyl, tolyl, cumyl, xylyl, naphthyl, phenanthrenyl, benzyl, and phenethyl. Hydrocarbon aryl groups of from 6 to 20 carbon atoms are preferable. Alkyl groups include methyl, ethyl, propyl, butyl, pentyl, hexyl, heptyl, octyl, nonyl and decyl radicals. R may be an alkoxy radical of from 1 to 10 carbon atoms such as a methoxy, ethoxy, propoxy, butoxy, pentoxy, hexoxy, heptoxy, nonoxy, and decoxy group. R may be an aryloxy group of from 6 to 12 carbon atoms such as phenoxy, phenethoxy and a pentamethyl phenoxy radical.

The compounds of the present invention may be prepared by several methods. One method of preparation involves the reaction of an unsaturated diol with a halogenated carbocyclic compound which contains at least one olefinic unsaturation in the carbocyclic ring. The coupling reaction is accompanied by the splitting out of a hydrohalo acid which may be neutralized with any suitable base. $NaHCO_3$, $Ca(HCO_3)_2$, $CaCO_3$, $KHCO_3$, $KH_2PO_4$ and $Li_2CO_3$ are examples of basic materials which may be employed to effect the coupling reaction. In general, any basic alkali metal, ammonium or alkaline earth metal salt or oxide may be used to complete the coupling reaction. Alkali metal bicarbonates are preferred coupling agents. The resulting diether contains at least two carbocyclic rings and at least three olefinic double bonds. The diether is then epoxidized with a peroxy compound (preferably an organic peroxide such as a peracid) to form a compound with at least three epoxy groups. The preparation of the compounds of the present invention may thus be accomplished in two steps:

(1) $2R'X + HO\text{---}Z\text{---}OH \rightarrow R'O\text{---}Z\text{---}O\text{---}R' + 2HX$ and (2) $R'\text{---}O\text{---}Z\text{---}O\text{---}R' \xrightarrow{[O]} G\text{---}O\text{---}A\text{---}O\text{---}G$ wherein X is a halogen (Cl, Br, F, I) and preferably a middle halogen (Cl, Br), R' is an organic group of from 4 to 20 carbon atoms containing an olefinically unsaturated carbocyclic nucleus of from 4 to 6 carbon atoms, Z is a divalent organic radical of from 4 to 20 carbon atoms containing at least one olefinic bond, and the two symbols G and A, as previously defined in Formula I, represent the corresponding epoxidized groups derived from the unsaturated groups R and Z, respectively. In the following examples, it is to be understood that the diol may represent the enol form of the corresponding aldehyde or ketone. Specific examples of this method include the following equations:

(1)

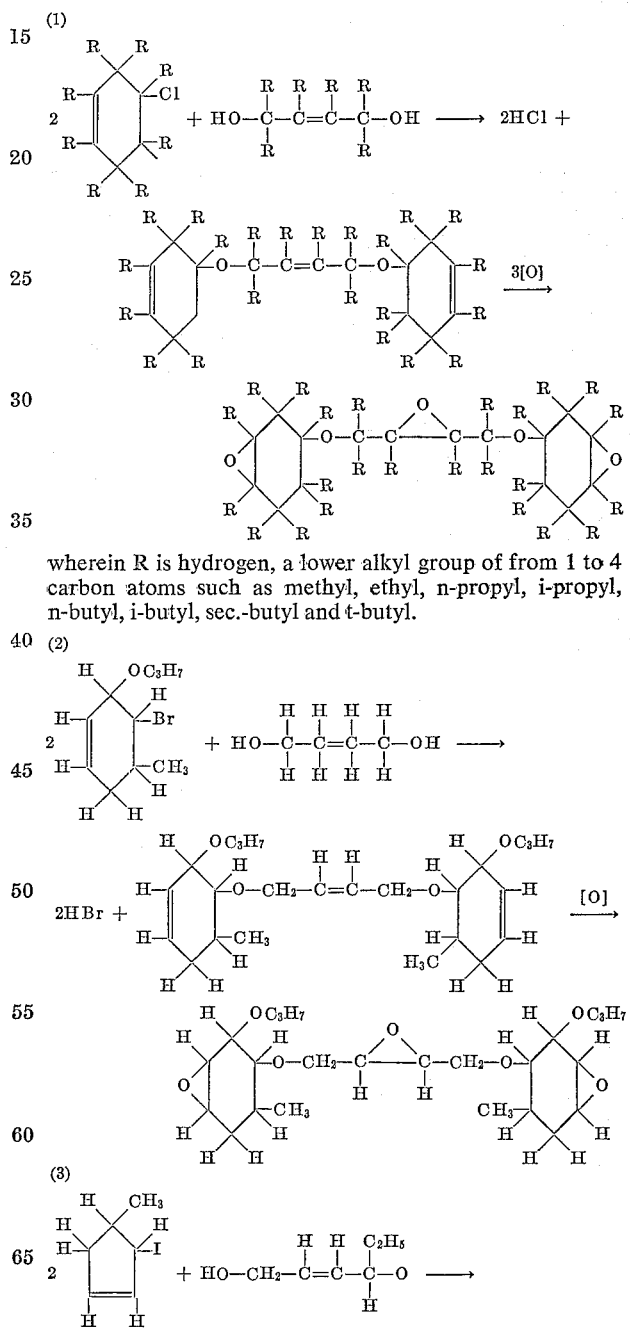

wherein R is hydrogen, a lower alkyl group of from 1 to 4 carbon atoms such as methyl, ethyl, n-propyl, i-propyl, n-butyl, i-butyl, sec.-butyl and t-butyl.

(2)

(3)

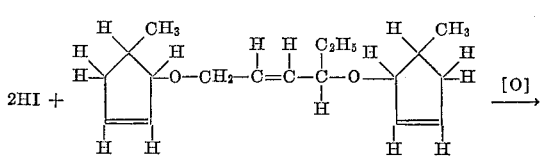

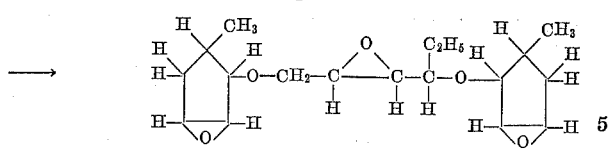

(4) 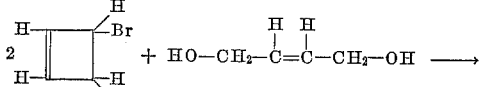

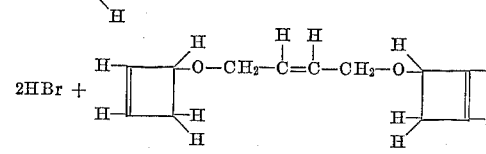

(5) 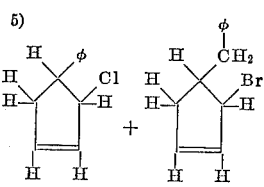

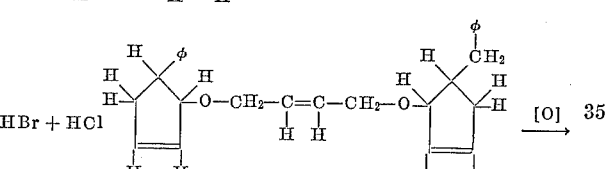

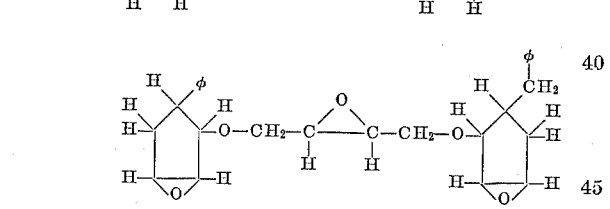

In Equations 5 and 6, mixtures of coupled products are obtained which contain the two symmetrical products in addition to the unsymmetrical products shown. In Equations 1–7, the symbol φ represents the phenyl radical, $C_6H_5$.

(6) 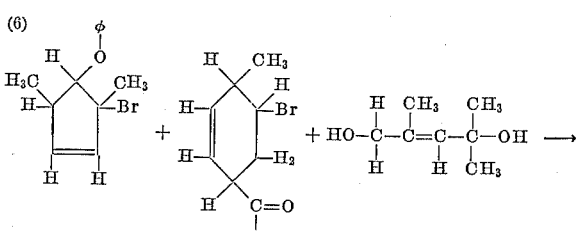

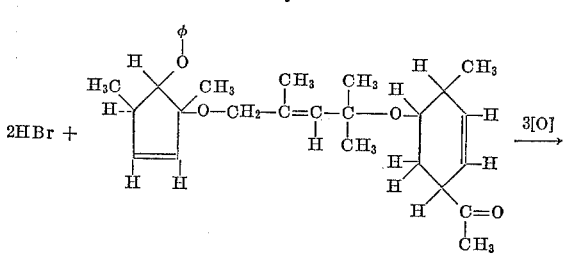

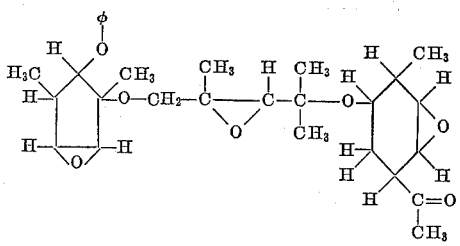

(7) 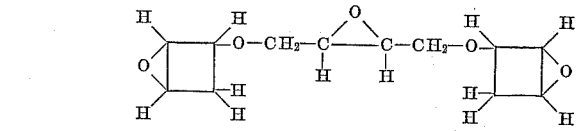

(8)

When the compounds of the present invention are prepared by first coupling an unsaturated diol and a halogenated unsaturated carbocyclic compound, and then epoxidizing the coupled product, it is desirable to use at least a stoichiometric amount of epoxidizing agent. By "stoichiometric amount" is meant the amount of the reactants necessary to maintain the chemically correct proportions of the reactants. If impure reactants are employed, the "stoichiometric amount" necessary remains the same, but an additional amount of the impure reactants is necessary in order to supply a stoichiometric amount.

Examples of unsaturated diols which may be coupled with the halogenated unsaturated carbocyclic compounds employed as starting materials include 2-butene-1,4-diol, 2-pentene-1,5-diol, 4-cyclohexene-1,3-diol, 2-cyclopentene-1,4-diol, 3-cyclopentene-1,4-dimethylol, 2-methyl-4-propyl-2-pentene-1,5-diol, 3,4-diphenyl-2,5-octadiene-1,8-diol, 5-pentyl-2,6-octadiene-1,8-diol, 1-propyl-4-methyl-4-ethyl-2-butene-1,4-diol, 1,1-diethyl-3-pentene-1,5-diol, 1-methyl-4-ethoxy-2-hexene-1,6-diol, 4-methyl-8-ethyl-9-benzyl-3,7-nonadiene-1,9-diol, 2-hydroxymethyl-2-alkyl-4-pentenol, 1,1-dimethylol-3-cyclohexene, and 6-dodecene-1,12-diol.

Any of these diols may be reacted with a halogenated unsaturated carbocyclic compound from 4 to 20 carbon atoms in which the carbocyclic nucleus contains from 4 to 8 carbon atoms (preferably from 4 to 6 carbon atoms). Examples of such carbocyclic compounds which may be reacted with the foregoing unsaturated diols include 3-chloromethyl-1-cyclobutene, 1-ethyl-3-(2'-chloroethyl)-1-cyclobutene, 3 - (3' - bromopropyl) - 1 - cyclopentene, 4-phenyl-3-(4'-chlorocyclohexyl)-1-cyclopentene, 3-(4'-iodobutyl) - 4,5 - diethyl-1-cyclohexene, 5-chloro-1,3-cyclohexadiene, 4-propoxy-3-chloro-1-cyclopentene, 4-tolyl-3-chloro-3,4-dimethyl-1-cyclopentene, and 5-methyl-4-benzl-3-iodo-1-cyclopentene. In naming the halogenated unsaturated carbocyclic compounds, the ring carbon atoms are numbered so as to give the lowest numbers to the unsaturated ring carbon atoms.

The halogenated unsaturated carbocyclic compounds and unsaturated diols employed as starting materials in the preparation of the compounds of the invention may be obtained by conventional methods of preparation. Thus, unsaturated carbocyclic compounds may be reacted with halogens (especially the lower halogens: Cl, Br, I) and the resulting mixture of substituted products separated or reacted in situ with the desired unsaturated diol or mixture of diols. Hydrohalogenation of carbocyclic compounds containing a conjugated diene structure in the ring (such as cyclopentadiene compounds and 1,3-cyclohexadiene compounds) yields a particularly desirable subclass of starting materials containing a single olefinic bond wherein the halogen is directly bonded to a carbon atom of the ring nucleus. Such hydrohalogenation reactions proceed by 1,4-addition similar to the reaction of hydrohalogens with butadiene-type compounds. The unsaturated diols may also be prepared by conventional methods, for example, by hydrolysis of the corresponding unsaturated dihalo compound. Methods for the preparation of 2-hydroxymethyl-2-alkylpentenols (lower alkyl radicals of 1–4 carbon atoms preferred) are disclosed in U.S. Patent 2,982,790, issued May 2, 1961 to Theiling et al. Dimethylol substituted cyclohexenes may be prepared by treatment of the Diels-Alder adduct of butadiene and acrolein (or substituted acrolein such as crotonaldehyde) with alkaline formaldehyde.

In addition to the unsaturated diols, unsaturated polyols containing a terminal unsaturation, such as 2,2-bis(hydroxymethyl)-4-pentenol (a trimethylol butene) may be used. Methods for the preparation of such unsaturated polyols are also disclosed in U.S. 2,982,790. Unsaturated diols may also be obtained by the Diels-Alder reaction of cyclopentadiene or butadiene with 2-butene-1,4-diol and/or 2-butyne-1,4-diol.

Unsaturated bicyclic halides may also be coupled with unsaturated diols, followed by epoxidation to give the novel epoxy compounds of the present invention. Such halides may be obtained by the hydrohalogenation of cycloheptadiene compounds, for example bicyclo[2.2.1]-hepta-2,5-diene. Similarly, the halogenated bicyclic compounds may be obtained by the Diels-Alder reaction of cyclopentadiene and vinyl halide to give very small amounts of the corresponding 2-halo-5-norbornene. In an analogous manner the Diels-Alder reaction of a cyclopentadiene and an allyl halide gives the corresponding 2-chloromethyl-5-norbornene. Cyclic terpenes which contain two ethylenic double bonds (for example, limonene) may also be converted to the corresponding unsaturated cyclic halides by hydrohalogenation of either one of the double bonds.

Another method of preparing the compounds of the present invention is by the reaction sequence:

(a) 2R'—OH+X—Z—X→R'—O—Z—O—R'+2HX (b) R'—O—Z—O—R' 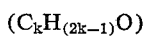 G—O—A—O—G wherein X is a halogen (Cl, Br, F, I) and preferably a middle halogen (Cl, Br), R' is an organic group of from 4 to 20 carbon atoms, Z is a divalent organic radical of from 4 to 20 carbon atoms containing at least one olefinic double bond, and the two symbols G and A, as previously defined in Formula I represent the corresponding epoxidized groups derived from the unsaturated groups R and Z, respectively.

The subclass of compounds represented by the formula:

G—O—A—OH wherein G and A having the aforementioned meanings are obtained by reacting one mole of the halogenated unsaturated carbocyclic reagent with one mole of the unsaturated diol, and then epoxizing the resulting product. Because a greater plurality of oxiranyl groups tends to improve the properties of the products when the compounds are used as reactive diluents, compounds of the formula G—O—A—O—G wherein both "G" groups contain at least one carbocyclic nucleus and at least one oxiranyl group are preferred. The preferred compounds can be produced in one step or can be prepared in a two-step synthesis in which the mono-ether is first formed and is then further reacted with another mole of halogenated unsaturated carbocyclic compound to form the diether. Epoxidation of the unsaturated diethers yields the desired compounds. For example, the reaction of one mole of 2-butene-1,4-diol with one mole of 3-chlorocyclohexene followed by epoxidation of the product gives a mixture containing 4 - (2',3' - epoxycyclohexoxy) - 2,3-epoxybutanol. Similarly, 4 - (2',3'-epoxycyclopentoxy)-2,3-epoxybutanol is obtained from 3-chlorocyclopentene.

The preferred compounds of the present invention may be conveniently grouped into three classes, depending on whether the carbocyclic ring contains four, five or six carbon atoms. These preferred compounds may be represented by the following formula:

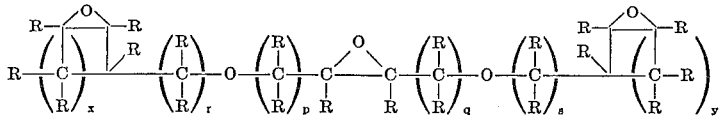

wherein $x$, $y$, $r$, $s$, $p$ and $q$ are integers such that $x$ and $y$ may be any integral value from 1 to 3, inclusive, $r$ and $s$ are integers from 0–4, inclusive, $p$ and $q$ are integers from 1 to 4, inclusive (preferably from 1 to 2, inclusive), and R may be hydrogen, a lower alkyl group such as methyl, ethyl, normal- and isopropyl, n-butyl, isobutyl, secondary butyl, and tertiary butyl; R may be an aryl containing radicals such as phenyl, benzyl, tolyl, naphthyl, cumyl, or xylyl; an alkenyl group of from 2 to 4 carbon atoms such as vinyl, allyl, or butenyl; a cycloalkyl group of from 4 to 12 carbon atoms such as cyclobutyl, cyclopentyl, cyclohexyl, cycloheptyl, or cyclooctyl; an oxiranyl containing monovalent group of the formula $(C_kH_{(2k-1)}O)$ in which $k$ is an integer from 1–15 (preferably from 1–10, inclusive) such as 2,3-epoxypropyl, 1,2-epoxyethyl, 2,3,5,6-diepoxyoctyl, and 2,3-epoxybutyl; and a carbocyclic oxiranyl-containing monovalent group of from 4 to 20 (preferably from 4–15) carbon atoms of the formula $(C_kH_{(2k-3)}O)$ in which $k$ is an integer from 4 to 8 (preferably from 4 to 6), inclusive, such as 2,3-epoxycyclobutyl, 2,3-epoxycyclopentyl, 3,4-epoxycyclopentyl, 2,3-epoxycyclohexyl, 3,4-epoxycyclohexyl, 3,4-epoxycycloheptyl, and 2,3-epoxycyclooctyl. Unsymmetrical compounds in which a hydrogen atom takes the place of the

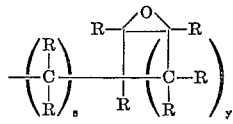

group are also included.

Examples of such compounds include 1,4-bis(2',3'-epoxycyclohexoxy) - 2,3-epoxybutane, 1,5 - bis(4',5'-dimethyl-2',3' - epoxycyclohexoxy)-2,3 - epoxypentane, 4-(2',3'-epoxycyclohexoxy) - 2,3 - epoxybutanol, 6-(2',3'-epoxycyclohexoxy)-3,4-epoxyhexanol, 7 - (2',3'-epoxycyclopentoxy)-2,3 - epoxyheptanol, 4-(1',2',3',4',5'-pentamethyl-2',3'-epoxycyclopentoxy)-2,3 - epoxybutanol, 1,4-bis(2',3' - epoxycyclopentoxy)-1-allyl - 2,3-epoxybutane, 1,4-bis(2',3' - epoxycyclopentoxy)-2,3 - epoxybutane, 4-(2'3'-epoxycyclopentoxy) - 2,3-epoxybutanol, 4(2'3'-epoxycyclopentylmethoxy)-1-ethyl-2,3 - epoxybutanol, 1,4-bis(2',3'-epoxycyclopentylmethoxy) - 2,3 - epoxybutane, 1,4 - bis(4' - methyl - 2',3'-epoxycyclopentoxy)-1-methyl-2,3-epoxybutane, and 1-(2',3'-epoxycyclopentoxy)-4(2',3'-epoxycyclohexoxy)-2,3-epoxybutane.

When the epoxy ether compounds of the present invention are unsymmetrical and contain a terminal hydroxyl (—OH) group, the compounds are named as derivatives of the corresponding alcohol. Thus, the compound 5-(1',2'-dimethyl-4'-ethyl-2',3' - epoxycyclopentoxy) - 3,4-epoxypentanol represents the compound:

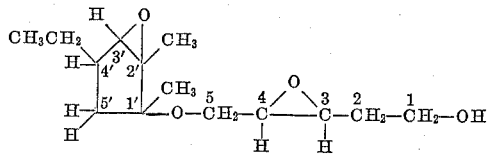

Diether compounds are named as derivatives of the corresponding epoxidized hydrocarbons. Thus, the compound 1-(2',3'-epoxycyclopentoxy)-5-(4'''-n-propyl-2''',3'''-epoxycyclopentoxy)-2,3-epoxypentane is represented by the structural formula:

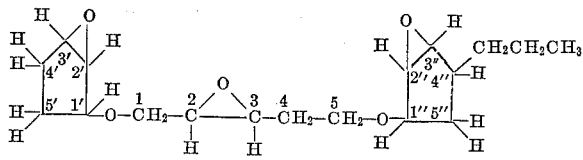

In the absence of a hydroxyl functional group on the carbon chain bridging the two linear oxygen atoms, the vicinal epoxy group is numbered so as to give the oxiranyl group the lowest numbers (i.e., 2,3-epoxy, rather than 3,4-epoxy in the preceding formula).

Any suitable method of epoxidation may be used to convert the olefinic double bonds of the intermediate ethers to oxiranyl groups. The peracids form an exceptionally good class of epoxidizing agents. Perbenzoic acid, perpropionic acid, and peracetic acid may each be used in an inert reaction medium at temperatures of from −15° C. to 100° C. to add oxygen across the olefinic double bonds of the intermediate unsaturated ethers. An amount of epoxidizing agent sufficient to epoxidize one or all of the unsaturated bonds may be used. At least a stoichiometric amount of epoxidizing agent should be used for every carbon to carbon double bond which is to be epoxidized. The epoxidized products may be separated from the reaction mixture by conventional methods such as vacuum distillation. A reaction time of from ten minutes to twenty-four hours may be used, depending upon the quantity and type of unsaturated ether which is to be epoxidized.

The polyepoxy ethers of the present invention are useful in the preparation of curable compositions and may be cured with conventional active organic hardeners such as polycarmoxylic acids, polycarboxylic acid anhydrides, polyhydric phenols, polycarboxylic acid polyesters, polyhydric alcohols, polythiols, polyfunctional amines, polyacyl halides, polyisothiocyanates and polyisocyanates. Specific examples of suitable curing agents are disclosed in U.S. 3,018,259, issued January 23, 1962, to Frostick et al. The curable and cured compositions may contain a specific polyepoxy compound prepared according to the present invention, or a mixture of these polyepoxy ethers may be employed. Similarly, one or more hardeners may be used in the formation of the cured compositions derived from the novel compounds of the present invention. The compositions of the present invention may contain from 0.1 to 5 active hardener groups (i.e., carboxyl, hydroxyl or amino groups) per epoxy group. A preferred ratio is from 0.6 to 2.5 active hardener groups per oxiranyl group.

The compositions prepared from the polyepoxy ethers of the present invention can be partially or fully cured at temperatures of from 5° C. to 250° C. and preferably from about 20° C. to 200° C. Various curing times of from about five minutes to two weeks can be used, depending upon the type and concentrations of polyepoxy ethers and hardeners which are employed and on the particular purpose for which the composition is to be used.

The polyepoxy ethers of the present invention, represented by Formula I, may be mixed with polyepoxy resins in amounts from 10% to 85% by weight of the mixture. It is preferred to use from 15% to 85% by weight (based on the total weight of the mixture) of the polyepoxy diethers of the present invention when forming mixtures with polyepoxy resins of the Bisphenol A type (that is, polyglycidyl ethers of Bisphenol A which is 2,2-bis(4-hydroxyphenyl)dimethylmethane, see "Epoxy Resins—Their Applications and Technology" by Henry Lee and Kris Nevelle (McGraw-Hill Book Company, New York), 1957, page 8. These ethers can be formed via the condensation of epichlorohydrin and Bisphenol A). Curable compositions of widely varying viscosity may be obtained by varying the amounts of the polyepoxy ethers of the present invention which are mixed with the polyglycidyl ethers of Bisphenol A. Curable compositions which incorporate from 30% to 70% (based on the total weight of the mixture) of the polyepoxy ethers represented by Formula I and mixtures thereof are particularly suitable for the formation of laminates and casts with high heat distortion values. Inert materials such as fillers, curing agents and solvents may be added in amounts of up to 60–70 parts for every 100 parts of curable resin composition. Suitable compositions are further illustrated in Table I.

*Table I*

| Parts of Compounds Represented by Formula I (G-O-A-O-G) | Parts of Polyglycidyl Ether of Bisphenol A or Other Polyepoxy Based Resins | Parts of Filler (Inert Solid or Liquid) | Parts of Non-reactive Solvents | Parts of Curing Agent |
|---|---|---|---|---|
| 85 | 12 | 15 | 0 | 20–40 |
| 65 | 30 | 0 | 20 | 60–80 |
| 45 | 55 | 10 | 10 | 30–50 |
| 25 | 70 | 0 | 0 | 25–50 |
| 40 | 60 | 0 | 0 | 15–35 |
| 35 | 65 | 20 | 0 | 10–50 |
| 30 | 70 | 0 | 0 | 5–60 |

The following examples are submitted to more clearly point out and illustrate the present invention but are not to be construed as limiting the invention in any way.

EXAMPLE I

The compound 3-chlorocyclopentene (obtained from the hydrochlorination of cyclopentadiene) is reacted with 2-butene-1,4-diol in the presence of $NaHCO_3$ according to the following reactions:

(I)

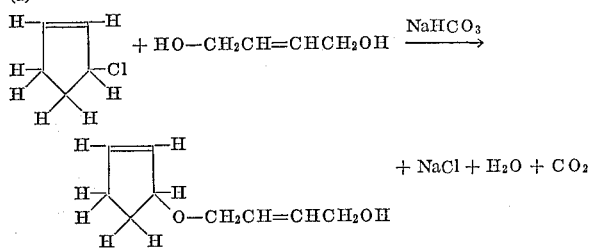

(II)

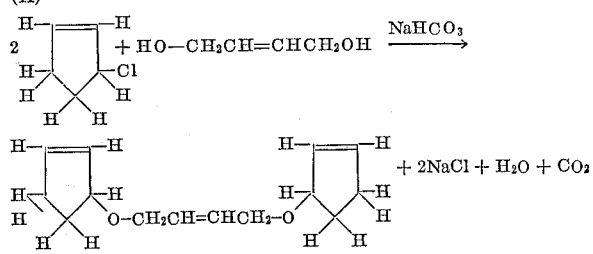

Eighty-eight grams (1.0 mole) of 1,4-butenediol, 210 grams (2.5 moles) of sodium bicarbonate, 4.0 grams of anhydrous magnesium sulfate, and 500 ml. of ethyl ether were stirred in a 2-liter flask which was cooled in an ice bath. At about 8° C. the cold 3-chlorocyclopentene was added. Carbon dioxide evolution began almost immediately and the temperature rose to 9° C. The reaction mixture was packed in ice and stirred at 8-9° C. for 2½ hours. The ice bath was then removed and the mixture stirred at room temperature. The mixture was then filtered and the salts washed several times with ether. The ether was distilled from the filtrate on a steam bath and the residue was distilled under reduced pressure in a spinning band column. The first two cuts (amounting to a total of 9 grams) were discarded. The infrared spectrum of cut number three (60 grams) had a strong hydroxyl band at 2.93μ and contained impure 4-cyclopentenoxy-2-butenol of the formula:

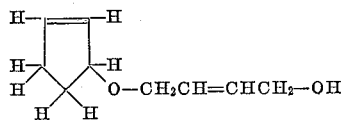

Cut number 4 (the last cut) amounted to 92 grams of bis-1,4(cyclopentenoxy)-2-butene with a trace of 4-cyclopentenoxy-2-butenol, leaving 15 grams of residue. The infrared spectrum of cut number 4 showed no hydroxyl band at 2.8–3.1μ.

EXAMPLE II

Cut number four from Example I was epoxidized according to the equations:

(1)

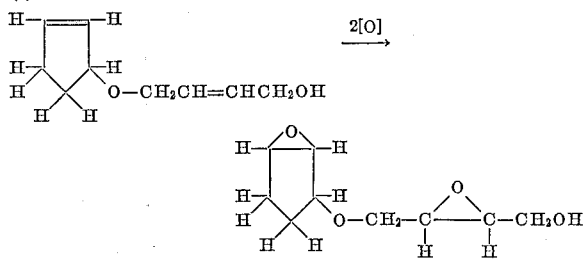

and (2)

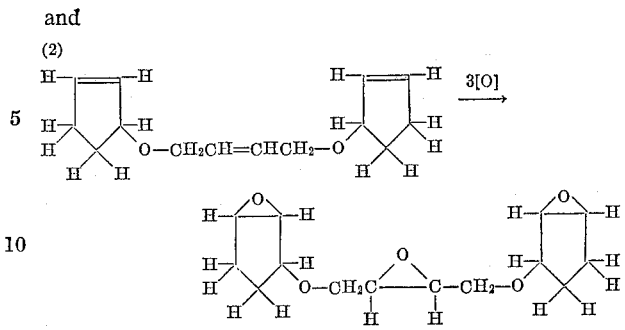

Fifty-five grams (0.25 mole) of bis-1,4-(2-cyclopentenoxy)-2-butene prepared in Example I, 190 grams (1.0 mole) of 40% peracetic acid, 17 ml. of 20% sodium acetate, and 300 ml. of chloroform were combined and stirred in a one-liter kettle. The slightly exothermic reaction was kept at from 24° to 40° C. with a water bath and the course of the reaction was followed by titration of the iodine liberated from KI solution with thiosulfate. The reaction was continued until about .6 mole of the peracetic acid was consumed. The mixture was then diluted with brine and the chloroform layer washed with salt solution followed by sodium bicarbonate solution until no longer acid. The chloroform layer was then washed once again with salt solution, dried over $MgSO_4$ and filtered. The mixture was then stripped of chloroform at a maximum temperature of 65° C. on a Rinco evaporator. The final product was a pale yellow liquid with an epoxide value of 1.003 eq./100 g. and weighed 57 g. The viscosity was about 250 cps. at 25° C. The yield was 85% of theory.

Analysis (wt. percent)

| | Found | Theory for $C_{14}H_{20}O_5$ |
|---|---|---|
| C, percent | 62.3 | 62.67 |
| H, percent | 7.5 | 7.51 |
| Epoxide value | 0.999 eq./100 g. | 1.118 eq./100 g. |

EXAMPLE III

A mixture of 290 grams (3.3 moles) of 1,4-butenediol, 753 grams of cyclopentenyl chloride, 59 grams (0.38 mole of cyclopentenoxy butenol)

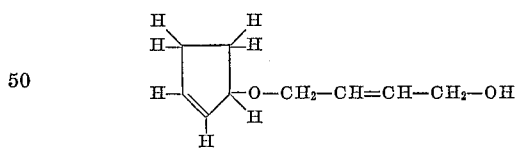

from cut number three of Example I, 1000 ml. of ethyl ether, 675 grams (8.0 moles) of sodium bicarbonate, and 100 grams of anhydrous magnesium sulfate were placed in a three liter flask and stirred for two and one-half hours at a temperature of from 5° C. to 10° C. The stirring was continued for 24–30 hours at room temperature. The salts were filtered off and were washed with additional ether. The filtrate was stripped of ether using aspirator vacuum on a steam bath at about 50° C. Seven hundred and forty-two grams of yellow product was obtained, representing a yield of 89% of 1,4-bis(2-cyclopentenoxy)-2-butene. The crude product was further purified by vacuum distillation.

EXAMPLE IV

In this example, the amounts of the reactants were scaled up.

Two hundred and twenty grams (1.0 mole) of 1,4-bis(2-cyclopentenoxy)-2-butene, 760 grams (4.0 moles) of 40% peracetic acid, 68 ml. of 20% sodium acetate, and 1000 ml. of chloroform were placed in a three-liter kettle equipped with a stirrer, condenser and thermometer.

The reactants were stirred at 40° C. for 6½ hours. A water bath was used to cool the reactants during the first one and one-half hours of the reaction. After six and one-half hours at 40° C., the temperature of the reaction mixture was reduced to ambient room temperature (about 20–25° C.) and stirring was continued while a one milliliter sample from the reaction mixture was treated with KI and the iodine liberated was reacted with 14.0 ml. of .1017 N sodium thiosulfate (a total time of about 22 hours). The chloroform layer was then washed free of excess acid using brine and sodium bicarbonate. The chloroform was stripped using a steam bath and aspirator vacuum. Removal of the solvent was completed with a Rinco evaporator to give 233 grams of a product with a cloudy amber color, representing an 87% yield of 1,4-bis(2,3-epoxycyclopentoxy)-2,3-epoxybutane.

Analysis (wt. percent)

|  | Found | Theory for $C_{14}H_{20}O_5$ |
|---|---|---|
| C, percent | 63.0 | 62.67 |
| H, percent | 7.6 | 7.51 |
| Epoxide | 0.946 eq./100 g. | 1.118 eq./100 g. |

Further distillation of the above 1,4-bis(2,3-epoxycyclopentoxy)-2,3-epoxybutane gave 17 grams of purified compound with the following analysis:

Analysis (wt. percent)

|  | Found | Theory for $C_{14}H_{20}O_5$ |
|---|---|---|
| C, percent | 63.1 | 62.67 |
| H, percent | 7.6 | 7.51 |
| Epoxide | 1.01 eq./100 g. | 1.118 eq./100 g. |

EXAMPLE V

To 167 grams of a mixture composed of 55% by weight of polyglycidyl ether of Bisphenol A (formed by the base catalyzed condensation of Bisphenol A and epichlorohydrin) and 45% by weight of 1,4-bis(2,3-epoxycyclopentoxy)-2,3-epoxybutane was added 24.4 grams (14.6 parts per hundred of resin) of diethylenetriamine. The resulting composition was cured for 4 hours at 100° C. and an additional 4 hours at 150° C. The cured composition was tested for flexural strength, tensile strength, Izod impact strength, heat distortion value, and solvent resistance. The results are recorded in Tables II and III.

Table II

Tensile strength (p.s.i.) _____ 12,500
Flexural strength (p.s.i.) _____ 21,190
Izod impact (ft./lb./in.) _____ 0.47
Heat distortion, ° C. _____ 107.3

Table III.—Percent (wt.) solvent resistance

|  | Soaking Cycle | | |
|---|---|---|---|
|  | 24 Hours | 1 Week | 1 Month |
| Water | +0.32 | +0.87 | +1.98 |
| Acetone | −0.05 | −0.08 | +0.11 |
| Benzene | −0.03 | +0.04 | +0.19 |
| 10% NaOH | +0.19 | +0.54 | +1.23 |
| 10% $H_2SO_4$ | +1.16 | +2.79 | +5.76 |

From Tables II and III, it is seen that the cured compositions have very good heat distortion properties and good solvent resistance. The Izod impact strength is the energy required (ft./lb./in. of notch) to break a notched test bar by means of a sharp blow and is an indication of the shock resistance of the material. A brittle or "notch sensitive" material has a low impact strength. The solvent resistance is obtained by measuring the percent by weight of solvent absorbed in a given period of time by a sample immersed in the solvent. A negative sign indicates an apparent weight loss by the sample. The heat distortion value is that temperature (degrees centigrade) at which the sample first begins to lose shape as a result of the application of heat. The tensile strength (p.s.i.) is the pulling force in pounds necessary to break a given sample, divided by the cross-sectional area expressed in square inches. The flexural strength is the pressure in pounds necessary to break a given sample when the load is applied to the center of a sample supported at its ends.

EXAMPLE VI

The composition of Example V was cured for an additional 16 hours at 150° C. A cured product was obtained with a heat distortion value of 130.3° C.

EXAMPLE VII

A curable composition was formed by mixing 55% by weight of polyglycidyl ether of Bisphenol A with 45% by weight of 1,4-bis(2,3-epoxycyclopentoxy)-2,3-epoxybutane. To 167 grams of this mixture was added 32 grams (19.2 parts per hundred parts of resin) of metaphenylenediamine as curing agent. The resulting composition was cured for four hours at 100° C. and then for an additional four hours at 150° C. The cured composition was tested for flexural strength, tensile strength, Izod impact strength, heat distortion value, and solvent resistance. The results are recorded in Tables IV and V.

Table IV

Tensile strength (p.s.i.) _____ 15,300
Flexural strength (p.s.i.) _____ 24,720
Izod impact (ft./lb./in.) _____ 0.51
Heat distortion, ° C. _____ 136.5

Table V.—Percent (wt.) solvent resistance

|  | 24 Hours | 1 Week | 1 Month |
|---|---|---|---|
| Water | +0.23 | +0.58 | +1.32 |
| Acetone | −0.06 | −0.09 | +0.14 |
| Benzene | −0.03 | −0.01 | +0.13 |
| 10% NaOH | +0.16 | +0.44 | +1.03 |
| 10% $H_2SO_4$ | +0.26 | +0.74 | +1.71 |

EXAMPLE VIII

The composition of Example VII was cured for an additional 16 hours at 150° C. and yielded a cured product with a heat distortion value of 158.5° C.

EXAMPLES IX–XII

Similar curable compositions containing a polyglycidyl ether of Bisphenol A and 1,4-bis(2,3-epoxycyclopentoxy)-2,3-epoxybutane were prepared using various percentages of the basic components. The viscosity of each curable composition was measured. The results are summarized in Table VI.

Table VI

| Example No. | Percent (wt.) of Polyglycidyl Ether of Bisphenol A | Percent (wt.) of 1,4-Bis(2,3-epoxycyclopentoxy)-2,3-epoxybutane | Viscosity (Poises, 25° C.) |
|---|---|---|---|
| IX | 80 | 20 | 40.6 |
| X | 65 | 35 | 19.5 |
| XI | 60 | 40 | 11.9 |
| XII | 55 | 45 | 10.0 |

I claim as my invention:
1. Polyepoxy compounds of the formula

G—O—A—O—G wherein
(1) At least one G group is a monovalent monoepoxycycloalkyl radical of from 4 to 20 carbon atoms and having from 4 to 6 ring carbon atoms,
(2) Every non-cycloalkyl G group is hydrogen and (3) A is a divalent linear radical of the formula

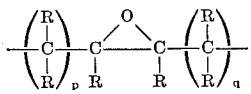

where $p$ and $q$ are integers from 1 to 4 and R is selected from the group consisting of hydrogen and a $C_1$–$C_4$ alkyl group.

2. 1,4-bis(2′,3′-epoxycyclohexoxy)-2,3-epoxybutane.
3. 4-(2′,3′-epoxycyclohexoxy)-2,3-epoxybutanol.
4. 1,4-bis(2′,3′-epoxycyclopentoxy)-2,3-epoxybutane.
5. 4-(2′,3′,epoxycyclopentoxy)-2,3-epoxybutanol.
6. 1,4 - bis(4′ - methyl - 2′,3′ - epoxycyclopentoxy)-1-methyl-2,3-epoxybutane.
7. A process for preparing polyexpoxide compounds of the formula:

G—O—A—O—G

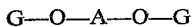

8. The process of claim 7 wherein the halogenated olefinic carbocyclic compound is a cyclopentyl halide with from 5 to 25 carbon atoms.
9. The process of claim 8 wherein the unsaturated diol is a butenediol of from 4 to 20 carbon atoms.
10. A process for the preparation of 1,4-bis(2′,3′-epoxycyclopentoxy)-2,3-epoxybutane which comprises reacting 2 moles cyclopentenyl chloride with 1 mole 1,4-butenediol in the presence of a basic alkali metal salt to form 1,4-bis-(cyclopentenoxy) butene and epoxidizing said 1,4-bis(cyclopentenoxy)butene with an organic peracid in at least an amount which is stoichiometrically necessary to epoxidize each carbon to carbon double bond at a temperature of from −15° to 100° C.
11. The process of claim 10 wherein the alkali metal salt is sodium bicarbonate.
12. A curable composition comprising
 (a) 15% to 85% by weight of a polyepoxy compound of the formula:

G—O—A—O—G wherein
 (1) At least one G group is a monovalent monoepoxycycloalkyl radical of from 4 to 20 carbon atoms and having from 4 to 6 ring carbon atoms,
 (2) Every non-cycloalkyl G group is hydrogen and
 (3) A is a divalent linear radical of the formula

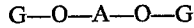

where $p$ and $q$ are integers from 1 to 4 and R is selected from the group consisting of hydrogen and a $C_1$–$C_4$ alkyl group, and

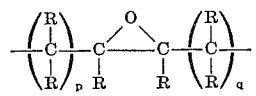

(b) 15% to 85% by weight of a polyglycidyl ether of 2,2-bis(4-hydroxyphenyl)dimethylmethane.
13. The composition of claim 12 wherein the polyepoxy compound is 1,4-bis(2,3-epoxycyclopentoxy)-2,3-epoxybutane.
14. A cured thermoset resin obtained from curing a composition comprising (a) 20% to 45% by weight of 1,4-bis(2,3-epoxycyclopentoxy)-2,3-epoxybutane and (b) 55% to 80% by weight of a polyglycidyl ether of 2,2-bis (4-hydroxyphenyl)dimethylmethane at a temperature of from 5° to 250° C. in the presence of an active organic hardener selected from the group consisting of diethylenetriamine and phenylenediamine.

wherein
 (1) At least one G group is a monovalent monoepoxycycloalkyl radical of from 4 to 20 carbon atoms and having from 4 to 6 ring carbon atoms,
 (2) Every non-cycloalkyl G group is hydrogen and
 (3) A is a divalent linear radical of the formula

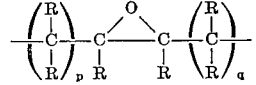

where $p$ and $q$ are integers from 1 to 4 and R is selected from the group consisting of hydrogen and a $C_1$–$C_4$ alkyl group, which comprises (a) reacting from one to two moles of a halogenated cycloalkene of from 4 to 20 carbon atoms and having from 4 to 6 ring carbon atoms with one mole of alkene diol of from 4 to 20 carbon atoms in the presence of a basic alkali metal salt and (b) epoxidizing the product of (a) with an organic peracid in at least an amount which is stoichiometrically necessary to epoxidize each carbon to carbon double bond at a temperature from −15° to 100° C.

References Cited by the Examiner
UNITED STATES PATENTS

| | | | |
|---|---|---|---|
| 2,543,419 | 2/1951 | Niederhouser | 260—2 |
| 3,018,294 | 1/1962 | Phillips et al. | 260—2 |
| 3,023,174 | 2/1962 | Batzer et al. | 260—348 |
| 3,025,307 | 3/1962 | Garger et al. | 260—2 |
| 3,072,678 | 1/1963 | Porret et al. | 260—2 |
| 3,073,799 | 1/1963 | Skiff | 260—2 |

OTHER REFERENCES

Morrison et al.: Organic Chemistry, pp. 112–15 and 421 (1959).

WILLIAM H. SHORT, *Primary Examiner.*

LOUISE P. QUAST, *Examiner.*

S. P. SULLIVAN, *Assistant Examiner.*